(12) United States Patent
Chacon

(10) Patent No.: US 8,127,947 B2
(45) Date of Patent: Mar. 6, 2012

(54) GARMENT SECURE TRANSPORT BAR

(76) Inventor: Ralph A. Chacon, Chandler, AZ (US)

( * ) Notice: Subject to any disclaimer, the term of this patent is extended or adjusted under 35 U.S.C. 154(b) by 41 days.

(21) Appl. No.: 12/819,187

(22) Filed: Jun. 19, 2010

(65) Prior Publication Data

US 2011/0186609 A1   Aug. 4, 2011

Related U.S. Application Data

(60) Provisional application No. 61/299,361, filed on Jan. 29, 2010.

(51) Int. Cl.
*A47H 1/00* (2006.01)
(52) U.S. Cl. .................................. 211/123; 211/124
(58) Field of Classification Search ............. 211/105.1, 211/105.3, 123, 124; 160/330
See application file for complete search history.

(56) References Cited

U.S. PATENT DOCUMENTS

| | | | | | |
|---|---|---|---|---|---|
| 1,282,174 | A | * | 10/1918 | Bescher | 211/123 |
| 1,613,354 | A | * | 1/1927 | Mathes | 211/16 |
| 1,695,517 | A | * | 12/1928 | Waldbauer | 211/124 |
| 1,975,543 | A | * | 10/1934 | Giessler | 211/124 |
| 2,056,544 | A | * | 10/1936 | Vanderveld | 211/123 |
| 2,153,905 | A | * | 4/1939 | Yankovitch | 223/88 |
| 2,580,282 | A | * | 12/1951 | Colley | 449/37 |
| 2,668,647 | A | * | 2/1954 | Osburn et al. | 224/551 |
| 3,021,958 | A | * | 2/1962 | Winkler | 211/124 |
| 3,318,460 | A | * | 5/1967 | Becker | 211/123 |
| 3,633,760 | A | * | 1/1972 | Vosbikian | 211/124 |
| 4,139,102 | A | | 2/1979 | Winton | |
| 4,260,063 | A | * | 4/1981 | Bennett et al. | 211/4 |
| 4,296,876 | A | * | 10/1981 | Lefebvre | 223/91 |
| 4,494,896 | A | | 1/1985 | DiFranco | |
| 4,753,355 | A | | 6/1988 | Hall | |
| 4,887,727 | A | | 12/1989 | Simmerman | |
| 6,223,915 | B1 | | 5/2001 | Waner | |
| 6,948,628 | B1 | | 9/2005 | Sahlem | |
| 7,037,728 | B2 | | 5/2006 | Yamashita | |

* cited by examiner

*Primary Examiner* — Korie Chan
(74) *Attorney, Agent, or Firm* — Daniel Boudwin

(57) ABSTRACT

A garment secure transport bar for supporting garment hangers on a garment transport cart. A rotating outer bar with a parallel securing bar rotates about an inner support bar. The inner support bar is fixed between two mounting brackets that attach to the top of a garment transport cart. Hangers can be hung on the bar and the securing bar rotated to secure the hangers in place and prevent them from bouncing off the cart. In an alternate embodiment, the transport bar is adjustable in length, so as to be capable of supporting garments on a variety of different size transport carts.

8 Claims, 3 Drawing Sheets

GARMENT SECURE TRANSPORT BAR

CROSS REFERENCE TO RELATED APPLICATION

This application claims the benefit of U.S. Provisional Application No. 61/299,361 filed on Jan. 29, 2010, entitled "Garment Secure Transport Bar".

BACKGROUND OF THE INVENTION

1. Field of the Invention

The present invention relates to an improved support bar for supporting and retaining garment hangers on garment transport carts.

2. Description of the Prior Art

The business of garment cleaning and distribution requires that the clothing be transported after a cleaning service is complete, or upon distribution of new clothing. Garments are often transported in bulk and hung on hangers, which are then hung on a support bar located on a garment transport cart. Typical carts are capable of carrying a number of hangered garments along the length of a top support bar and can come in varying lengths, such as a 72P size cart. A common problem with these carts, especially when transported on the road, is that bumps cause the garment hangers to fall off the support bar. Such an event has obvious drawbacks when dealing with new or newly cleaned garments. Prior art devices are known in this field that attempt to secure garments on a transport bar. However, known prior art devices have several drawbacks, such as in their complex and expensive designs, lack of adjustable lengths, and lack of providing a universal fit for multiple standard size garment transport carts.

U.S. Pat. No. 4,139,102 to Winton describes a clamping device for attachment to a garment support bar. The Winton patent, while being effective in securing garment hangers, must be installed onto an existing bar, which requires tools and time. The device also includes numerous parts, which may cause manufacturing time and cost to be high. Furthermore, the Winton device is not intended to fit on garment transport carts, but instead describes a clamping device for fixed garment bars, such as those in campers or trailers. As a result of its intended use, the device is not adjustable in length and is therefore incapable of fitting multiple size bars, such as those found on standard transport carts, with the clamping device. Similarly, U.S. Pat. No. 4,494,896 to DiFranco describes garment support bar specifically designed for use in tractor trailers. While Difanco claims a rotating rod that secures the hangers in place, it is not suitable, nor intended, for attachment to a transport cart Other known devices clamp down on the hangers, as opposed to rotating or pivoting about the support bar. These designs are, by their own nature, more complex and require more moving parts, which in turn leads to higher manufacturing costs as well as higher costs to the consumer. These devices are best illustrated in U.S. Pat. No. 4,753,355 to Hall and U.S. Pat. No. 6,223,915 to Waner, while less complicated forms of the clamp down design are illustrated in U.S. Pat. No. 4,887,727 to Simmerman and U.S. Pat. No. 7,037,728 to Cameron. In addition to the much different clamp down designs of these patents, they face the same drawbacks as in Winston in that they are not adjustable and not clearly intended for use on transport carts.

Still other known devices in the field of garment support bars include those that consist of a removable cover attached over the hangers and secured to the bar. For example, U.S. Pat. No. 6,948,628 to Sahlem describes a curved cover that sits over the tops of the hangers and support bar and is strapped to the bar with a hook and loop type material. While this device is economical in design, it requires that the user remove the device each time access to a hanger is required. Such a device may be well suited for long term shipment and storage, but may be less practical when delivering cloths one at a time, as the device would have to be repeatedly removed and secured again.

SUMMARY OF THE INVENTION

In view of the foregoing disadvantages inherent in the known types of garment securing bars now present in the prior art, the present invention provides a new garment support and retaining bar wherein the same can be utilized for providing convenience for the user when transporting garments on garment transport carts. The object of the present invention is to provide a garment transport bar that attaches to standard garment transport carts. The support bar will replace existing support bars and will have a pivoting bar for securing garment hangers on the transport bar.

Another object of the present invention is to provide a garment transport bar that is adjustable in length and easily removable so as to fit a variety of different sized carts and to be easily moved from one cart to another.

Yet another object of the present invention is to provide a garment transport bar that is simple and inexpensive to manufacture.

Other objects, features and advantages of the present invention will become apparent from the following detailed description taken in conjunction with the accompanying drawings.

BRIEF DESCRIPTIONS OF THE DRAWINGS

FIG. 6 Shows the two piece split shaft collar separated into its two halves while

DETAILED DESCRIPTION OF THE INVENTION

Figure 1:
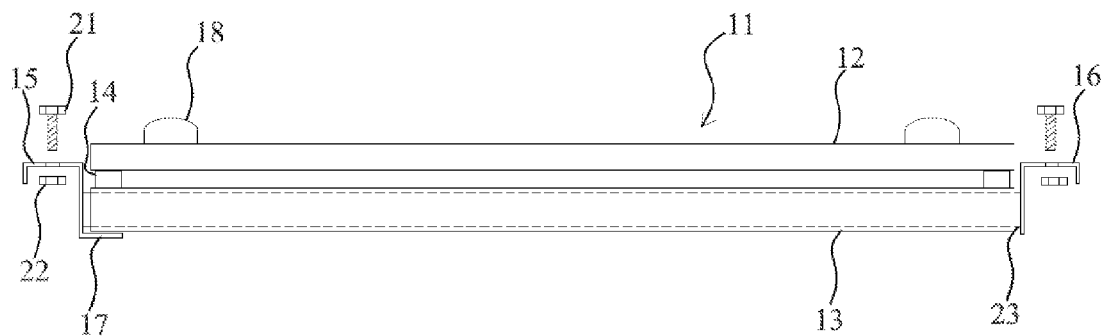
FIG. 1 Shows a front view of the fixed garment transport bar in the open position.

Referring now to FIG. 1, there is shown a front view of the fixed garment transport bar 11. An tubular inner support bar 23 is installed inside of a tubular outer support bar 13 and extends slightly outward from each end of the outer support bar 13. Fixed to the exterior surface at each end of the outer support bar 13 are spacers 14. A tubular securing bar 12 attaches to the spacers 14 so as to be in a parallel relationship with the outer bar 12, wherein the spacers cause a gap between the outer bar and the securing bar. The outer support bar is free to rotate about the inner support bar. The inner support bar is fixed at a first end to a first mounting bracket 16 and at a second end to second mounting bracket 15. Each mounting bracket is secured to the top of a garment transport cart. Threaded fasteners 21 and nuts 22 pass through holes 20 on the upper horizontal surface of the mounting brackets and secure the brackets to the transport cart.

Figure 2:
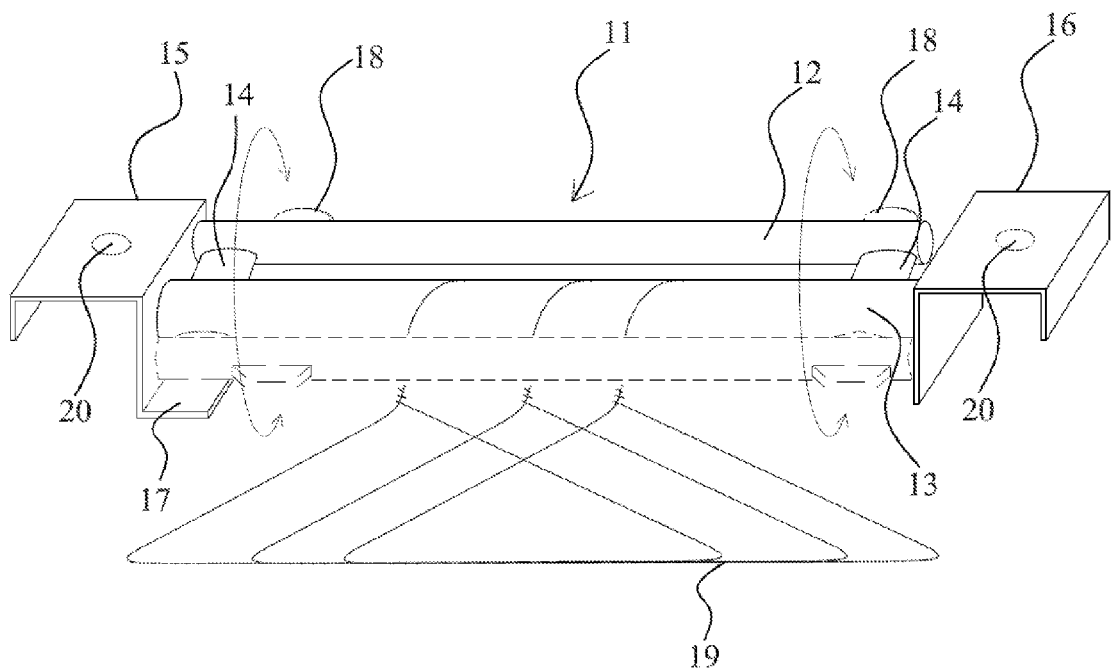
FIG. 2 Shows a perspective view of the fixed garment transport bar in the open and closed position.

Referring now to FIG. 2, there is shown a perspective view of the fixed garment transport bar 11. Hangers 19, for hanging garments on, are hung on the outer support bar 13. Tabs 18 are located on the exterior surface at each end of the securing bar 12, radially opposite the spacers 14. These tabs can be grasped and used to rotate the securing bar into the closed position, as shown by the dotted lines. A horizontal lower surface forms a lip 17 located at the lower end of the second mounting bracket 15. The horizontal lip acts as a stop, restricting the movement of the securing bar 12 in both the open and closed position. In the closed position, the securing bar 12 will prevent the hangers 19 from bouncing off of the outer support bar 13.

Figure 3:
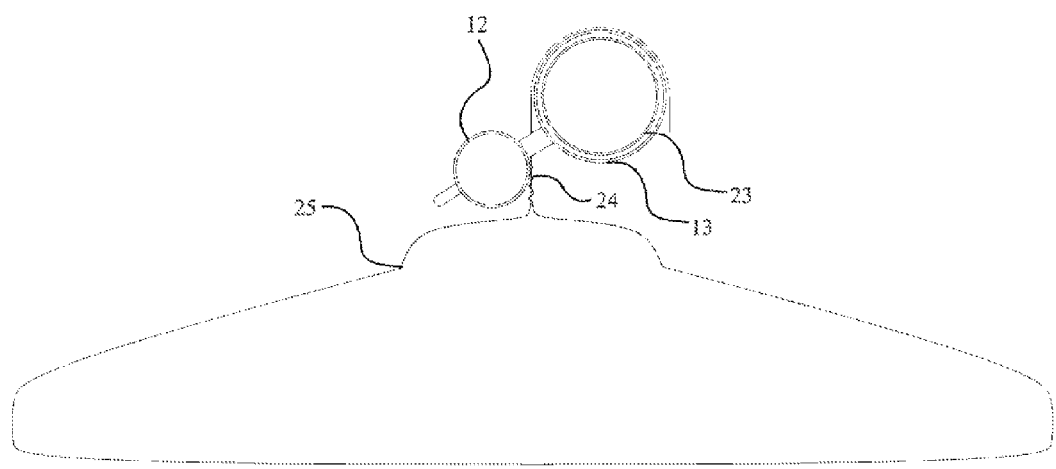
FIG. 3 Shows a sectional side view of the garment transport bar in the secure position.

Referring now to FIG. 3, there is shown a sectional side view of the garment transport bar in the closed position. When in the closed position the securing bar 12 will rest against the neck 24 and the body 25 of the hanger 19, preventing it from bouncing up off of the outer support bar 13.

Figure 4:
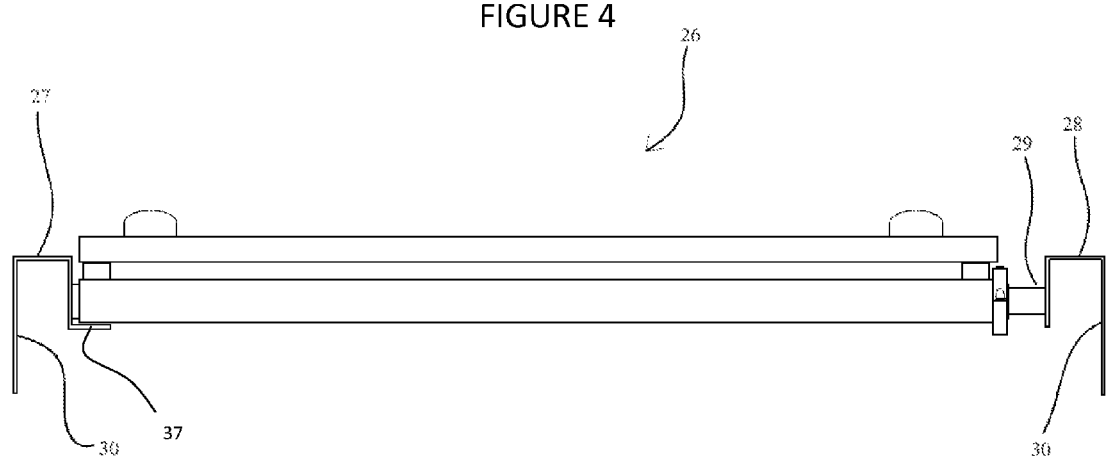
FIG. 4 Shows a front view of the adjustable length garment transport bar in the open position.

Referring now to FIG. 4, there is shown a front view of an alternate, adjustable embodiment of the garment transport bar 26, wherein the inner support bar 23 is fixed only at the second end to a second elongated mounting bracket 27. First elongated mounting bracket 28 has a shaft 29 fixed to it. Shaft 29 is slidably inserted into the inner support bar 23 so as to make the garment transport bar adjustable in length. Each mounting bracket has an elongated outer vertical surface 30. The mounting brackets are placed on a garment transport cart, wherein the elongated vertical surfaces 30 will stabilize the bar and prevent it from bouncing off the cart. The second elongated mounting bracket 27 has a lower horizontal surface 37 that acts as a stop for securing bar 12 in both the open and closed positions. The elongated vertical surfaces 30 are used in place of permanent fixity, such as fasteners, so that the garment transport bar may be easily moved from one cart to another, or removed with multiple garments attached when, for example, the cart is incapable of traversing obstacles, such as stairs.

Figure 5:
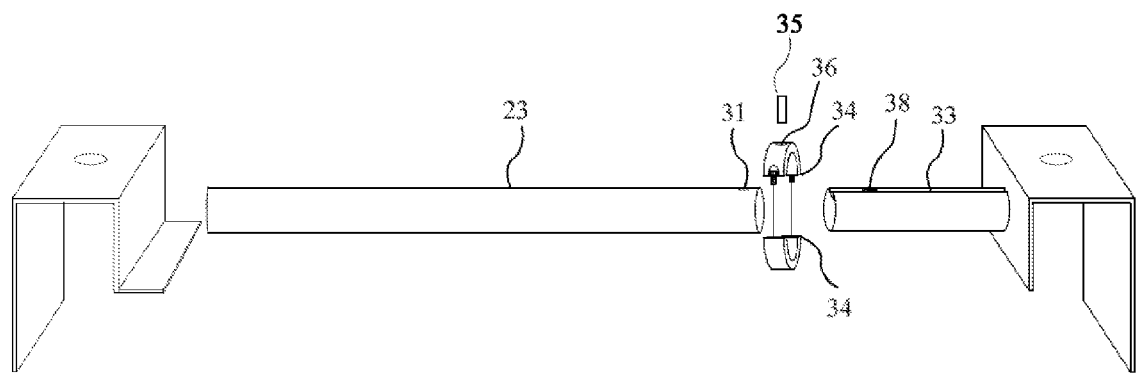
FIG. 5 Shows the inner support bar of the adjustable length garment transport bar.
Figure 6:
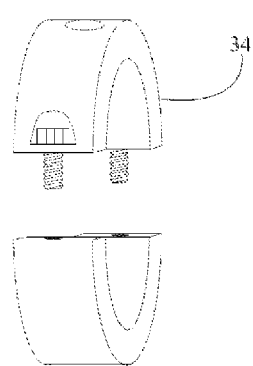
Figure 7:
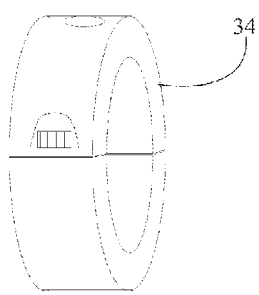
FIG. 7 shows it clamped together.

Referring now to FIG. 5, there is shown a perspective view of the adjustable garment transport bar, with the outer support bar and securing bar removed for clarity of the inner structure and connections. The inner support bar 23 has a hole 31 through its surface at the first end. A key way 33 runs along the length of the shaft 29. A two piece split shaft collar 34, as shown in FIG. 6 and FIG. 7, is clamped around the outer surface of the inner support bar 23. A hole 36 in the two piece split shaft collar lines up with the hole 31 in the inner support bar, which in turn lines up with the key way 33 in the shaft. A pin 35 is inserted through the holes and into the key way to allow the shaft and inner support bar to be rotatably fixed but adjustable in length. A raised bump 38 forms a stop at the second end of the key way 33, wherein the pin 35 cannot pass the stop; therefore, with the pin in place, the support bar cannot separate from the shaft.

In use an individual would simply place the garment secure transport bar over a garment cart, with the mounting brackets resting on top of the cart's side walls. The fixed embodiment would be fastened to the cart, while the adjustable embodiment would simply rest on the cart. Garment hangers would be hung on the outer support bar and the securing bar would be rotated into the closed position to secure the hangers in place.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Furthermore, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A garment securing support bar for securing garment hangers on a garment transport cart, comprising;
   a tubular inner support bar having first and second ends, wherein said first end is fixed to a first mounting bracket and said second end is fixed to a second mounting bracket for mounting said inner support bar to a garment transport cart; a tubular outer support bar rotates about said inner support bar from an open position to a closed position and has an exterior surface for supporting garment hangers thereon; a tubular securing bar having spacers at a first and second end, wherein said spacers are fixed to said exterior surface of said outer bar causing said outer bar and said securing bar to be joined in parallel with a gap therebetween; said securing bar and said outer support bar can be rotated from said open position to said closed position, wherein said securing bar will secure garment hangers when in said closed position and wherein said second mounting bracket has a horizontal lower surface that limits said rotation of said securing bar in both said open and closed positions.

2. The apparatus of claim 1, wherein tabs for grasping and rotating said securing bar are fixed on said exterior surface of said securing bar at said first end and said second end radially opposite of said spacers.

3. The apparatus of claim 1, wherein said first and second mounting brackets have an upper horizontal surface with a hole therethrough, said upper horizontal surface being fixedly mounted to a garment cart with threaded fasteners.

4. An adjustable length garment securing support bar for securing garment hangers on a garment transport cart, comprising;
   a tubular inner support bar having first and second ends, wherein said second end is fixed to a second mounting bracket and said first end is slidably attached to a shaft with a first end fixed to a first mounting bracket; a tubular outer support bar rotates about said inner support bar from an open position to a closed position and has an exterior surface for supporting garment hangers thereon; a tubular securing bar having spacers at a first and second end, wherein said spacers are fixed to said exterior surface of said outer support bar causing said outer support bar and said securing bar to be joined in parallel with a gap therebetween; said securing bar and said outer support bar can be rotated from said open position to said closed position, wherein said securing bar will secure garment hangers when in said closed position and wherein said second mounting bracket has a horizontal lower surface that limits said rotation of said securing bar in both said open and closed positions.

5. The apparatus of claim 4, wherein tabs for grasping and rotating said securing bar are fixed on said exterior surface of said securing bar at said first end and said second end radially opposite of said spacers.

6. The apparatus of claim 4, wherein said first and second mounting brackets have an outward most vertical surface, said vertical surface being elongated to provide stability and securement for said support bar while allowing it to be quickly removed, adjusted, and set onto a different cart.

7. The apparatus of claim 4, wherein said shaft has a key way that aligns with a hole through said first end of said inner support bar, a two piece split shaft collar with a hole therethrough and a pin for attaching to said first end of said inner support bar, wherein said pin is inserted through said hole and into said key way for slidably adjusting said length of said inner support bar; a raised bump in said key way near a second end of said shaft prevents said pin from sliding past it and therefore sets a maximum length for said inner support bar and ensures that said inner support bar does not separate from said shaft when garments are secured thereto.

8. An adjustable length garment securing support bar for securing garment hangers on a garment transport cart, comprising;

a tubular inner support bar having first and second ends, wherein said second end is fixed to a second mounting bracket and said first end is slidably attached to a shaft with a first end fixed to a first mounting bracket; a tubular outer support bar rotates about said inner support bar from an open position to a closed position and has an exterior surface for supporting garment hangers thereon; a tubular securing bar having spacers at a first and second end, wherein said spacers are fixed to said exterior surface of said outer support bar causing said outer support bar and said securing bar to be joined in parallel with a gap therebetween; said securing bar and said outer support bar can be rotated from said open position to said closed position, wherein said securing bar will secure garment hangers when in said closed position wherein said shaft has a key way that aligns with a hole through said first end of said inner support bar, a two piece split shaft collar with a hole therethrough and a pin for attaching to said first end of said inner support bar, wherein said pin is inserted through said hole and into said key way for slidably adjusting said length of said inner support bar; a raised bump in said key way near a second end of said shaft prevents said pin from sliding past it and therefore sets a maximum length for said inner support bar and ensures that said inner support bar does not separate from said shaft when garments are secured thereto.

* * * * *